United States Patent [19]
Knox et al.

[11] Patent Number: 5,217,797
[45] Date of Patent: Jun. 8, 1993

[54] CHEMICALLY RESISTANT DIAPHRAGM

[75] Inventors: John B. Knox, Wilmington, Del.;
John M. Connelly, Jr., Rising Sun, Md.

[73] Assignee: W. L. Gore & Associates, Inc., Newark, Del.

[21] Appl. No.: 837,717

[22] Filed: Feb. 19, 1992

[51] Int. Cl.$^5$ .................................................. B32B 7/00
[52] U.S. Cl. ................................. 428/246; 92/103 F;
92/103 SD; 428/167; 428/252; 428/253;
428/421; 428/422
[58] Field of Search ............... 428/167, 246, 252, 253,
428/421, 422; 92/103 F, 103 SD

[56] References Cited

U.S. PATENT DOCUMENTS

| | | |
|---|---|---|
| 2,545,857 | 3/1951 | Perkins et al. ............... 31/86 |
| 3,135,137 | 6/1964 | Jack, Jr. ...................... 92/103 |
| 3,204,568 | 9/1965 | Grossfield .................. 103/150 |
| 4,133,927 | 1/1979 | Tomoda et al. .............. 428/215 |
| 4,238,992 | 12/1980 | Tuck, Jr. ..................... 92/103 SD |
| 4,610,918 | 9/1986 | Effenberger et al. ........ 428/245 |
| 4,680,220 | 7/1987 | Johnson ...................... 428/284 |
| 4,943,475 | 7/1990 | Baker et al. ................. 428/422 |
| 4,954,388 | 9/1990 | Mallouk et al. ............. 428/422 |
| 4,976,550 | 12/1990 | Shobert ....................... 384/298 |
| 5,036,551 | 8/1991 | Dailey et al. ................ 428/422 |
| 5,071,609 | 12/1991 | Tu et al. ...................... 428/422 |
| 5,141,800 | 8/1992 | Effenberger et al. ........ 428/422 |
| 5,160,773 | 11/1992 | Sassa ........................... 428/422 |

Primary Examiner—James J. Bell
Attorney, Agent, or Firm—Gary A. Samuels

[57] ABSTRACT

A composite diaphragm containing a flexible composite of a flexible polymer and an expanded polytetrafluoroethylene fabric on which is adhered to one surface a solid polytetrafluoroethylene layer. Additionally a composite diaphragm is disclosed which has a concentrically arranged ribbed elastomeric layer attached to a solid polytetrafluoroethylene layer.

13 Claims, 2 Drawing Sheets

5,217,797

CHEMICALLY RESISTANT DIAPHRAGM

FIELD OF THE INVENTION

The present invention relates to diaphragms for use in pumps and valves. More particularly, the present invention relates a diaphragm composed of a flexible polymer adhered to a solid polytetrafluoroethylene layer.

BACKGROUND OF THE INVENTION

The rubber and plastics industries for years have used reinforcing fabric members in conjunction with flexible polymers to produce reinforced flexible composite materials to fabricate a variety of mechanical goods such as tires, hose, liners, diaphragms, seals, gaskets, protective fabrics, tapes, accumulators, airbags, fuel cells, fuel tanks, flexible couplings, medical tubing, structural bearings and so forth.

The purpose of reinforcing members in reinforced flexible materials is to limit deformation of the composite materials, to satisfy requirements of the intended service, to strengthen the composite, to maintain dimensional stability, to absorb energy and to extend service life.

Over the years, improved reinforcing fabrics have progressed through cotton, rayon, nylon, polyester, glass, steel, polyaramides and polytetrafluoroethylene (PTFE) fibers. These materials have been used in the form of individual fibers or cords and in the form of a woven, knitted or braided fabrics. Each of these reinforcing fabrics contributes unique attributes to the reinforced flexible composite material's physical properties and each suffers from limitations in certain critical physical properties such as strength, elongation, stiffness, flexibility, fatigue resistance, creep resistance, and chemical and thermal stability.

A particular advance in the use of fabrics to reinforce composites was taught in U.S. Pat. No. 2,772,444 to Burrows, et al. outlining the use of PTFE in oriented fiber form. Industry has investigated the use of PTFE in oriented fiber form in composite structures, however, because of its low tensile strength, poor creep resistance and high cold flow, its use as reinforcement in flexible composites has been very limited. U.S. Pat. No. 3,513,064, to westley, et al. discloses the use of PTFE fiber in conjunction with a fluoroelastomer and a fluoroplastic for use in protective clothing where the low physical properties of the fabric are adequate for the end-use.

One area where reinforced composites have demonstrated utility is in diaphragms for use in valves and for pumps. In the past, a wide range of flexible polymers combined with reinforcing fabrics have been used. The identity of the particular materials used is dependent on the end use of the diaphragm, however, when a diaphragm is to be used in areas requiring chemical and thermal resistance, fluoropolymers, such as fluorinated thermoplastics consisting of copolymers of tetrafluoroethylene, copolymers of vinylidine fluoride, copolymers of chlorotrifluoroethylene, are typically used. These materials exhibit a good degree of chemical resistance and are reasonably flexible and tough over a wide temperature range. However when more hazardous chemicals are present and greater environmental resistance is needed, polytetrafluoroethylene (PTFE) is the material of choice due to its high molecular weight and high degree of fluorination both of which impart chemical resistance to the resultant diaphragm. However, PTFE does not possess the physical properties of the other flexible polymers used in diaphragms, and if used as a single diaphragm, a greatly reduced flex life may result.

Normally to use a PTFE diaphragm, diaphragm pumps for pumping hazardous chemicals are fitted with two diaphragms; one diaphragm comprised of a fluorocarbon resin to resist degradation by the hazardous chemicals, and a second diaphragm comprised of fabric-reinforced elastomer to withstand the mechanical, pneumatic or hydraulic forces needed to drive the pump. However, a two diaphragm system does have weaknesses. Pumps fitted with two diaphragms require additional hardware, as compared to pumps fitted with one diaphragm, to maintain the diaphragms in the proper orientation with each other. The diaphragms must be fitted in the proper orientation and in the proper order for the pump to operate. Another problem with a two diaphragm system is that the two diaphragms may become separated from one another and form a gap or cavity between the diaphragms so that continued operation of the pumping means creates a negative pressure between the two diaphragms. When negative pressure is created between the two diaphragms, there is a tendency for material to be sucked between the diaphragms. This may result in premature failure of the diaphragm system and/or contamination of the material being pumped. If the material sucked between the two diaphragms is hazardous in nature, the hazardous material may issue from the pump creating an unacceptable risk to personnel in the vicinity of the pump. Also, two diaphragm systems are difficult to install. Typically, two diaphragm systems require the two diaphragms to be torqued together at installation as well as at some period of time after installation since deformation experienced by the PTFE diaphragm under the load applied would not be identical to the deformation experienced by the fabric-reinforced elastomer diaphragm resulting in a loss of compressive force between the two diaphragms. Also, forces generated by a driving means and transmitted by the diaphragm comprised of fabric-reinforced elastomer may not be evenly distributed over the PTFE diaphragm thereby causing a premature failure of the diaphragm system.

It is to the production of a composite diaphragm, having a PTFE face securely attached to a flexible backing that the present invention is directed.

BRIEF DESCRIPTION OF THE INVENTION

A composite diaphragm is disclosed which comprises the following layers, in sequence; a continuous layer of solid polytetrafluoroethylene and a layer of a composite material comprising at least one ply of a fabric comprised of expanded porous polytetrafluoroethylene fibers and at least one flexible polymer. The flexible polymer is selected from the class consisting of thermosetting elastomer, thermoplastic elastomer, and thermoplastic polymer and having a flexural elastic modulus less than 1,400 MPa.

An optional elastomeric layer may be attached to the layer of composite material. On the optional elastomeric layer, a series of concentrically arranged elastomeric ribs may be formed.

Alternatively, a composite diaphragm is disclosed which comprises the following layers, in sequence; a continuous layer of solid polytetrafluoroethylene and an elastomeric layer. On the elastomeric layer, a series of concentrically arranged elastomeric ribs formed is formed.

DETAILED DESCRIPTION OF THE INVENTION

Figure 1:
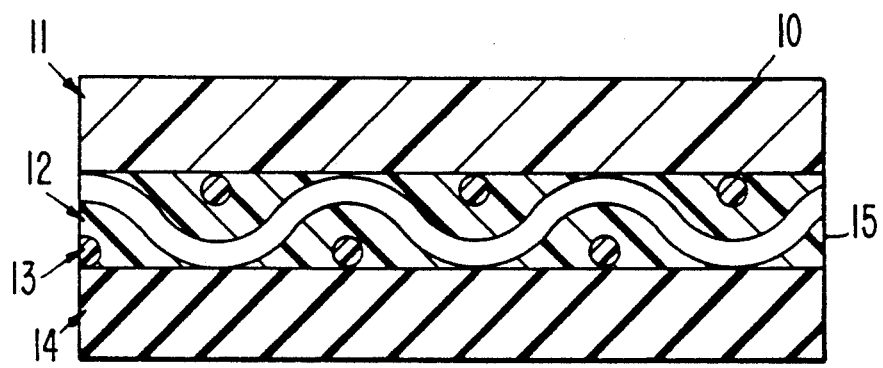
FIG. 1 is a cross sectional view of the composite diaphragm of the invention.

Referring now to the figures, 10 is a cross section of a composite diaphragm of the invention as shown in FIG. 1. The composite diaphragm is comprised of the following layers, in sequence: a solid polytetrafluoroethylene (PTFE) layer 11 and a reinforced flexible composite material 15. Additionally, an elastomeric layer 14 may be adhered to the reinforced flexible composite material.

The solid PTFE layer 11 is a layer of full density PTFE. An example of full density PTFE is skived PTFE. This material provides the composite diaphragm with an inert outside surface thereby increasing the durability and chemical resistance of the diaphragm. The solid PTFE layer has an inside surface which is adhered to the reinforced flexible composite material. Optionally, this inside surface may be treated to increase the surface energy of the PTFE and thereby increase its adherence to the reinforced flexible composite material. Treatments commonly known in the art include the use of alkali naphthanates, or other surface modifiers, to improve adhesion to polymers.

Still referring to FIG. 1, the reinforced flexible composite material 15 is comprised of a flexible polymer 12 which is combined with a fabric 13 comprised of expanded porous polytetrafluoroethylene (ePTFE) fiber. Subsequently, such individually coated fabric layers (or plies) can be combined into multiple ply constructions. Such multiple ply constructions can be combined using plies based on other reinforcing fabrics.

Single plies can be woven from ePTFE fiber combined with other fibers (such as quartz, glass, aramids or nylon).

Fabric 13 (woven, knitted, braided or wound) of ePTFE fiber, may be treated to increase the surface energy of the ePTFE fiber, and combined with certain thermosetting or thermoplastic flexible polymeric materials 12 to produce the reinforced flexible composite material 15. Treatments commonly known in the art include the use of alkali naphthanates, or other surface modifiers, to improve adhesion to polymers. The ratio by volume of flexible polymer to fabric is between 5–95% and 95–5%.

U.S. Pat. Nos. 3,953,566 and 4,187,390 both to Gore respectively teach a process for producing ePTFE articles as well to a wide variety of shaped ePTFE articles such as films, tubes, rods and continuous filaments. Both U.S. Pat. Nos. 3,953,566 and 4,187,390 both to Gore are incorporated herein by reference.

Filaments of ePTFE are prepared by the method described in U.S. Pat. No. 3,962,153 to Gore, incorporated herein by reference, in different deniers and are subsequently constructed into fabrics using weaving, knitting, braiding and winding techniques. These fabrics may subsequently be treated with etchants, such as alkali naphthanates, or other surface modifiers, to improve adhesion to polymers.

Still referring to FIG. 1, the fabric comprised of ePTFE fiber is laminated, coated or saturated with flexible polymers by a solution coating, melt coating, calendaring, extruding, laminating, press molding, rotomolding, thermo-forming, or vacuum forming processes. The resulting reinforced flexible composite fabric forms an integral article.

The reinforced flexible composite material comprises at least one ply of fabric made from or containing ePTFE fiber in combination with one or more polymers having a flexural elastic modulus less than 1,400 MPa, said reinforced flexible composite material having a modulus at 5% strain less than 170 MPa and an "energy management" property determined through tensile testing, of greater than 670 joules/cm. of fabric matrix (by volume).

Energy management is defined herein as the total amount of work a material can withstand prior to failure, normalized for the volume of fabric.

The energy management capabilities of the reinforced flexible composite materials in this invention are characterized by calculating the total area under the stress/strain curve produced in tensile testing, which results in greater than 670 J/cm of fabric matrix (by volume).

These unique "energy management" characteristics are combined with the outstanding characteristics of ePTFE fibers, such as environmental stability (both thermal and chemical) and surface properties such as a high degree of wear resistance, a low coefficient of friction and a high degree of self lubricity, to provide a reinforced flexible composite materials for use in diaphragms.

When compared to other reinforced composite materials, the reinforced flexible composite material present in the instant invention exhibits high energy management values, defined as the total amount of work a material can withstand prior to failure. The reinforced flexible composite material exhibits toughness rather than brittleness thereby allowing further work to be introduced into the reinforced flexible composite material after ultimate strength of the reinforced flexible composite material has been achieved.

The flexibility of the reinforced flexible composite material is demonstrated by relatively low stress levels at associated strain levels exhibited by the reinforced flexible composite material during physical testing. The reinforced flexible composite material also exhibits high tensile and burst strengths in physical tests. When compared to known reinforced composite materials, the reinforced flexible composite material present in the instant invention represents an unique combination of the mechanical attributes of toughness, flexibility, strength with enhanced energy management values.

One preferred embodiment of the invention is where the flexible polymer is a thermosetting elastomer selected from the class consisting of fluoroelastomers including those containing hydrogen and those not containing hydrogen, perfluoroelastomers, and fluoroelastomers containing silicone moieties, nitrile elastomers, acrylic elastomers, olefin diene elastomers, chlorosulfonated polyethylene elastomers, polychloroprene elastomers, butyl and halogenated butyl elastomers, styrene-butadiene elastomers, polydiene elastomers and silicone elastomers. It is preferred that the thermosetting elastomers in the above-mentioned class have a flexural elastic modulus (ASTM D790-84a)of less than 1,400 MPa.

Another preferred embodiment of the invention is where the flexible polymer is a thermoplastic elastomer selected from the class consisting of copolyetherester elastomers, polyurethane elastomers, styrene polyolefin block copolymer elastomers, polyamide elastomers, ethylene copolymer elastomers, and thermoplastic elastomers produced by the process of dynamic vulcanization as described in U.S. Pat. No. 4,130,535 to Coran et al. wherein a blend of a curable elastomer and a plastic results in a thermoplastic elastomeric composition. The thermoplastic elastomers in the above-mentioned class have a flexural elastic modulus (ASTM D790-84a) of less than 1,400 MPa.

Another preferred embodiment of the invention is where the flexible polymer is a thermoplastic having a flexural elastic modulus (ASTM D790-84a) less than 1,400 MPa, and selected from the class consisting of fluorinated thermoplastics consisting of copolymers of tetrafluoroethylene, copolymers of vinylidine fluoride, copolymers of chlorotrifluoroethylene, polyolefins, and plasticized polyvinyl chlorides.

Still referring to FIG. 1, the solid PTFE layer 11 is adhered to the reinforced flexible composite material 15 through any known means. Preferably, the flexible polymer 12 of the reinforced flexible composite material is a thermoplastic, so that the solid PTFE layer may be adhered to the reinforced flexible composite material through the introduction of a sufficient amount of heat and pressure to the flexible polymer contained in the reinforced flexible composite material to cause the thermoplastic to flow and adhere to the solid PTFE layer. The inventive diaphragm can be constructed by pressure laminating, press molding, autoclave molding, roto-molding, hot roll lamination, vacuum forming or thermo-forming processes.

Still referring to FIG. 1, an optional elastomeric layer 14 may be adhered to the reinforced flexible composite material 15. The elastomeric layer imparts additional elastomeric qualities to the diaphragm of the instant invention such as elastomeric recovery. The elastomeric layer may be comprised of an elastomeric polymer which may be thermosetting elastomers or thermoplastic elastomers. Thermosetting elastomers may be selected from the class consisting of fluoroelastomers including those containing hydrogen and those not containing hydrogen, perfluoroelastomers, and fluoroelastomers containing silicone moieties, nitrile elastomers, acrylic elastomers, olefin diene elastomers, chlorosulfonated polyethylene elastomers, polychloroprene elastomers, butyl and halogenated butyl elastomers, styrene-butadiene elastomers, polydiene elastomers and silicone elastomers. It is preferred that the thermosetting elastomers in the above-mentioned class have a flexural elastic modulus (ASTM D790-84a) of less than 1,400 MPa.

Thermoplastic elastomers may be selected from the class consisting of copolyetherester elastomers, polyurethane elastomers, styrene polyolefin block copolymer elastomers, polyamide elastomers, ethylene copolymer elastomers, and thermoplastic elastomers produced by the process of dynamic vulcanization as described in U.S. Pat. No. 4,130,535 to Coran et al. wherein a blend of a curable elastomer and a plastic results in a thermoplastic elastomeric composition. The thermoplastic elastomers in the above-mentioned class have a flexural elastic modulus (ASTM D790-84a) of less than 1,400 MPa.

The elastomeric layer may be either in a reinforced or nonreinforced form. The elastomeric layer in reinforced form is comprised of the elastomeric polymer in which is embedded a reinforcing fabric. The reinforcing fabric may be any fabric that is presently used to reinforce elastomers. Such fabrics include fabrics comprised of polymeric fibers such as nylon fibers, polyester fibers, polyaramides fibers, PTFE fibers, and ePTFE fibers.

Figure 2:
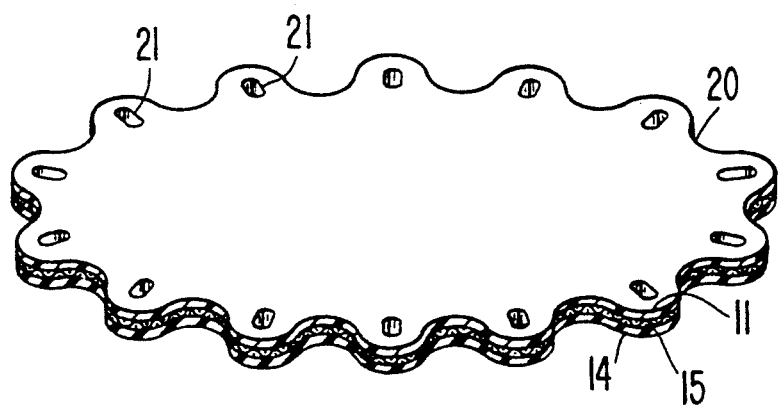
FIG. 2 is a perspective view of a flat embodiment of the diaphragm of the invention.

Referring now to FIG. 2, a composite diaphragm 20 in a flat or planar form is depicted. The solid PTFE layer 11, the reinforced flexible composite material 15 and the elastomeric layer 14 are depicted in sequence. A means for attaching a peripheral edge of the diaphragm is disclosed as a series of through holes 21 capable of receiving bolts or other such means for securing the diaphragm in place. Alternatively, the means for attaching the peripheral edge of the diaphragm may be a peripheral bead.

Figure 3:
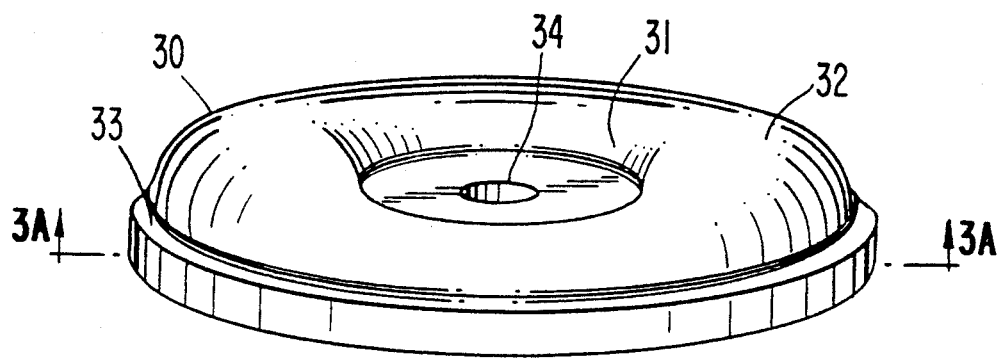
FIG. 3 is a perspective view of a molded embodiment of the diaphragm of the invention.

Referring now to FIG. 3, a composite diaphragm 30 in a molded form is depicted. A means for attaching a peripheral edge of the diaphragm is disclosed as a peripheral bead 33. Alternatively, the means for attaching the peripheral edge of the diaphragm may be a series of through holes. The composite diaphragm 30 in a molded form has a central through hole 34 for attachment of the inventive diaphragm to a means for reciprocating the inventive diaphragm.

Still referring to FIG. 3, the composite diaphragm in a molded form is comprised of convex areas 32 and concave areas 31. The shape and placement of the convex and concave areas of the diaphragm are dependent on design requirements of the article in which the diaphragm is placed.

In order to produce the composite diaphragm in a molded form, a molding process is performed. The various layers which comprise the inventive diaphragm are arranged in a mold having a desired shape. The mold containing the various layers is subsequently subjected to a sufficient amount of heat and pressure through press molding, autoclave molding, roto-molding, vacuum forming or thermoforming processes such that the layers conform to the mold and retain the desired shape upon removal from the mold.

Figure 3A:
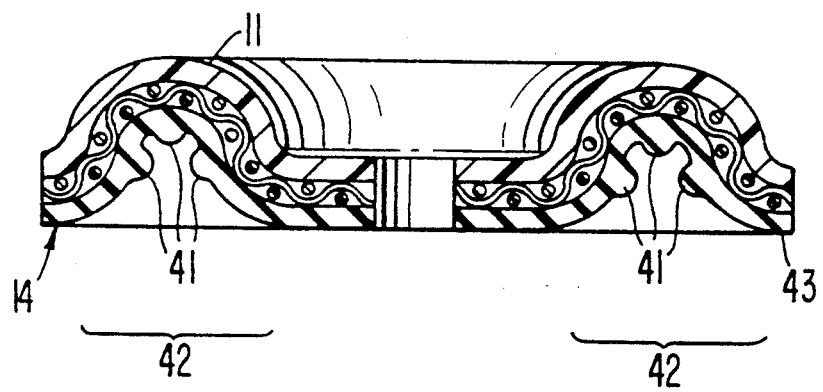
FIG. 3A is a cross sectional view of the diaphragm of FIG. 3 taken along line 3A.

Referring now to FIG. 3A, a cross-sectional view of the diaphragm in FIG. 3 taken along line 3A is depicted. On a back surface 43 of the diaphragm, a series of concentrically arranged elastomeric ribs 41 are formed in the elastomeric layer 14. These elastomeric ribs are located in a displacement section 42 of the instant diaphragm. The displacement section 42 of the diaphragm is defined as that portion of the diaphragm that reciprocally flexes as the diaphragm is used. These elastomeric ribs prevent the solid PTFE layer 11 from forming radial creases by distributing the forces associated with reciprocation of the diaphragm. Without these ribs, the solid PTFE layer may form radial creases thereby weakening the solid PTFE layer and causing premature failure of the diaphragm due to a concentration of work introduced into the solid PTFE layer at the radial creases. Placement of the ribs in the elastomeric layer, rather than in the solid PTFE layer, allows greater freedom in rib design. The elastomeric layer diffuses forces associated with the ribs when the diaphragm is reciprocally flexed so that even ribs having an angular profiles, such as a rectangle, do not appear to concentrate forces on the solid PTFE surface and therefore have utility in extending the useful life of the instant diaphragm. The shape and placement of the series of elastomeric ribs formed in the elastomeric layer of the diaphragm are dependent on design requirements of the article in which the diaphragm is placed.

Figure 4:
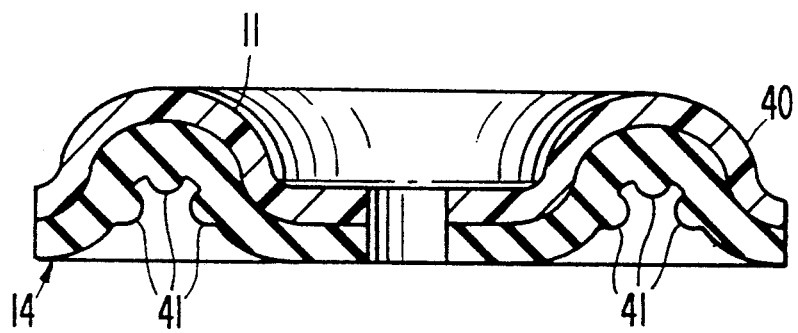
FIG. 4 is a cross sectional view of the composite diaphragm of the invention.

Referring to FIG. 4, a diaphragm 40 comprised of a solid PTFE layer 11 adhered to an elastomeric layer 14 containing a series of concentrically arranged ribs 41 is depicted. These elastomeric ribs prevent the solid PTFE layer 11 from forming radial creases by distributing the forces associated with reciprocation of the diaphragm. Without these ribs, the solid PTFE layer may form radial creases thereby weakening the solid PTFE layer and causing premature failure of the diaphragm due to a concentration of work introduced into the solid PTFE layer at the radial creases. The elastomeric layer 14 may be either in a reinforced or nonreinforced form. The elastomeric layer in reinforced form is comprised of the elastomeric polymer in which is embedded a reinforcing fabric. The reinforcing fabric may be any fabric that is presently used to reinforce elastomers. Such fabrics include fabrics comprised of polymeric fibers such as nylon fibers, polyester fibers, polyaramides fibers, PTFE fibers, and ePTFE fibers. The identity of the solid PTFE layer 11 and the elastomeric layer 14 are the same as previously disclosed herein.

TEST METHODS

Flexural Elastic Modulus

The flexural elastic modulus of the flexible polymer is determined by ASTM D790-84a; Test Methods for Flexural Properties of Unreinforced and Reinforced Plastics and Electrical Insulation Materials.

Tensile Testing

The stress at break, strain at break, stress at 5% elongation, modulus at 5% strain and energy management characteristics of the materials are determined using ASTM D 882-83 Method A. A constant rate-of-jaw separation type machine (Instron Testing Machine, Model 1122) equipped with a strip chart recorder is used.

Materials are cut using a die into 2.5 cm × 15.2 cm samples in both the warp and the fill directions. Alternatively, samples are cut using a die into a 15.2 cm dog bone shape. Samples are not conditioned. The testing is performed in a controlled room at a temperature of 21° C. and a relative humidity of 65%.

The gauge length of the test specimen is 10.2 cm, and the strain rate employed is 5.08 cm/minute. The strip chart recorder is run at 12.70 cm/minute or a ratio of strip chart speed to strain ratio of 2.5:1. All samples are tested to break if the load cell limit is not exceeded. If the load cell limit is exceeded, the test is aborted, and the value stated as in excess of the load limit.

Stress/strain levels at "break" are recorded as well as stress at 5% strain. If a sample breaks prior to 5% strain, the stress at break is listed, and the lack of a 5% strain value noted.

The energy management of the material is obtained by calculating the total area under the stress/strain curve produced in this test. This value is normalized for fabric volume and recorded as J/cm of fabric thickness by volume.

Modulus at 5% strain of the material is calculated by determining the amount of stress at 5% strain for a material and dividing that value by the fabric matrix thickness.

The following examples are presented to further explain the teachings of the instant invention and not to limit the scope of the invention. Various modifications and equilivalents will readily suggest themselves to those of ordinary skill in the art without departing from the spirit and the scope of the instant invention.

EXAMPLES

Example 1

A composite diaphragm of the instant invention was produced in the following manner:

A reinforced flexible composite material was produced containing a fabric of a plain woven 400 denier ePTFE fiber (Rastex fiber available from W. L. Gore & Assoc., Inc., Elkton, Md.) having 21 fibers/cm in the warp direction and a 20 fibers/cm in the fill direction. The plain woven fabric was sandwiched between two 0.13 mm thick layers of a copolymer of tetrafluoroethylene and perfluoro(propyl vinyl ether) (PFA) (500 LP available from E. I. duPont de Nemours, Co.). A 0.51 mm thick layer of a skived PTFE tape certified to MIL-D-22241 Type 2, Grade A (Cadillac Plastics, Pennsauken, N.J.) was placed against a surface of the PFA layer, and the reinforced flexible composite material was placed within a vacuum press for 30 minutes at a temperature of 365° C. at a pressure of 1,030 MPa. The resulting reinforced flexible composite material had a thickness of 0.94 mm.

A PFA surface of the reinforced flexible composite material was treated with a sodium napthanate etchant (Tetra Etch etchant available from W. L. Gore & Assoc., Newark, Del.). On the treated PFA surface, an adhesive was applied by brush and allowed to dry under ambient conditions (Chemlok 250, available from Lord Corporation, Erie, Pa.). The adhesive had been diluted 30% by weight with toluene.

A 4.2 mm thick layer of an elastomeric polymer was applied to the adhesive previously applied to the PFA surface (a Neoprene compound based on Neoprene GK available from E. I. duPont de Nemours, Co.). The layer of the elastomeric polymer was adhered to the PFA surface by placing the reinforced flexible material in a platen press heated to 100° C. for 30 sec.

A pre-form of the reinforced flexible material was cut from the material produced, and this pre-form of material was placed in a mold having a shape. The mold was placed in a platen press which applied 7,580 MPa to the reinforced flexible material at a temperature of 167° C. for 20 min forming a diaphragm.

The diaphragm was removed from the mold after cooling and any extra material was trimmed from the final part. The final part was then tested in a in a Wilden M-4 pump driven by 400 N of air pressure against a 127 cm head of water at a rate of 66 cycles per minute. The diaphragm was allowed to remain in the pump until the diaphragm developed a through hole or was determined that failure of the diaphragm was imminent after periodic inspection. A population of three diaphragm was produced and tested. The results of that testing are found in Table 1.

COMPARATIVE EXAMPLE 1

A comparative composite diaphragm was produced in following manner:

A reinforced flexible composite material was produced by placing a fabric as in Example 1, which had been previously etched by a sodium napthanate etchant (Tetra Etch etchant available from W. L. Gore & Assoc., Newark, Del.), between two layers of PFA film. One layer of PFA had a thickness of 0.05 mm while the other layer of PFA had a thickness of 0.51 mm.

The reinforced flexible composite material was placed within a vacuum press for 60 minutes at a temperature of 340° C. and a pressure of 1,030 MPa. The resulting reinforced flexible composite material had a thickness of 0.71 mm.

The surface of the reinforced flexible material containing the 0.05 mm PFA layer was treated with a sodium napthanate etchant. On the treated PFA surface, an adhesive was applied by brush as in Example 1.

A layer of an elastomeric polymer was applied to the treated PFA layer as in Example 1 except that the layer of an elastomeric polymer was applied through the use of a pair of heated calendar rolls.

Two pre-forms of the reinforced flexible material were cut and molded into the shape as in Example 1. The resulting diaphragms were tested as in Example 1. The results of that testing are found in Table 1.

TABLE 1

| | |
|---|---|
| Example 1 | 4,818,000 cycles (+/− 1432M) |
| Comparative Example 1 | 703,000 cycles (+/− 53M) |

EXAMPLE 2

A composite diaphragm of the instant invention was produced in the following manner:

A reinforced flexible composite material was produced as in Example 1. A reinforced elastomeric polymer was applied to the PFA surface of the reinforced flexible composite material. The reinforced elastomeric polymer consisted of, in sequence, a 0.20 mm thick layer of the elastomeric polymer, a reinforcing fabric of a nylon scrim, (WABCO 7200-46, available from Westinghouse Air Brake Company, Greensburg, Pa.), and a 3.94 mm thick layer of the elastomeric polymer were arranged on the treated PFA surface and adhered to the flexible reinforced composite through the application of 48 MPa of pressure in a platen press heated to 93° C. for a dwell time of 30 seconds.

Three pre-forms of the reinforced flexible material were cut and molded into the shape as in Example 1. The resulting diaphragms were tested as in Example 1. The results of that testing are found in Table 2.

EXAMPLE 3

A composite diaphragm of the instant invention was produced in the following manner:

The reinforced flexible material was produced as in Example 1. Two pre-forms of the reinforced flexible material were cut from the material produced, and these pre-forms of material were placed in a mold having a shape. The shape of the mold was altered from the shape of the mold as in Example 1 in that three grooves having rectangular profiles had been machined into a face of the mold so that when heat and pressure was applied to the mold, the elastomeric polymer flowed into the grooves of the mold and formed elastomeric ribs on the resulting diaphragm as seen in FIG. 3A. The resulting diaphragms were tested as in Example 1. The results are found in Table 2.

EXAMPLE 4

A composite diaphragm of the instant invention was produced in the following manner:

A reinforced flexible composite material was produced as in Example 2. Two pre-forms of the reinforced flexible material were cut from the material produced, and these pre-forms of material were placed in a mold as in Example 3. The resulting diaphragms with formed elastomeric ribs were tested as in Example 1. The results of this testing are found in Table 2.

TABLE 2

| | |
|---|---|
| Example 2 | 6,558,000 cycles (+/− 2002M) |
| Example 3 | 6,941,000 cycles (+/− 1047M) |
| Example 4 | >8,324,000 cycles |

COMPARATIVE EXAMPLE 2

A composite diaphragm was produced in the following manner:

A 0.51 mm thick layer of a skived PTFE tape certified to MIL-D-22241 Type 2, Grade A (Cadillac Plastics, Pennsauken, N.J.) was obtained. One surface of the skived PTFE tape was treated with an etchant (Tetra Etch etchant available from W. L. Gore & Assoc., Newark, Del.). The treated surface of the PTFE tape was brushed with an adhesive and allowed to dry under ambient conditions (Chemlok 250, available from Lord Corporation, Erie, Pa.). The adhesive had been diluted 30% by weight with toluene.

A reinforced elastomeric polymer was applied to the surface of the PTFE tape containing the adhesive surface. The reinforced elastomeric polymer consisted of, in sequence, an 0.20 mm thick layer of an elastomer (a Neoprene compound based on Neoprene GK available from E. I. duPont de Nemours, Co.), a reinforcing fabric of a nylon scrim, (WABCO 7200-46, available from Westinghouse Air Brake Company, Greensburg, Pa.), and six 0.76 mm layers of the previously disclosed elastomer.

A pre-form of the material was cut and the material was placed in mold of the shape as in Example 1. The material was molded into a diaphragm as in Example 1. The resulting diaphragm was tested as in Example 1. The result of that testing is found in Table 3.

EXAMPLE 5

A composite diaphragm of the instant invention was produced in the following manner:

A 0.51 mm thick layer of a skived PTFE tape was obtained, treated with etchant, and brushed with an adhesive as in Comparative Example 2. A reinforced elastomeric polymer was applied to the surface of the PTFE tape containing the adhesive surface. The reinforced elastomeric polymer consisted of, in sequence, either an 0.20 mm thick or a 0.76 mm thick layer of an elastomer, (a Neoprene compound based on Neoprene GK available from E. I. duPont de Nemours, Co.), a reinforcing fabric of a nylon scrim, and a 3.94 mm thick layer of the previously disclosed elastomer.

Two pre-forms of the material were cut and placed in mold of the shape in which three grooves had been machined into the mold as in Example 3 so that the resulting diaphragms contained formed elastomeric ribs. The resulting diaphragms were tested as in Example 1. The results of that testing are found in Table 3.

TABLE 3

| Example 5 | 8,917,000 cycles (+/− 1,814M) |
|---|---|
| Comparative Example 2 | 3,001,000 cycles |

We claim:

1. A composite diaphragm comprising the following layers in sequence:
   (a) a continuous layer of solid polytetrafluoroethylene, and
   (b) a layer of a composite material comprising at least one ply of a fabric comprised of expanded porous polytetrafluoroethylene fibers combined with a flexible polymer selected from the class consisting of thermosetting elastomer, thermoplastic elastomer, and thermoplastic polymer and having a flexural elastic modulus less than 1,400 MPa.

2. A composite diaphragm as in claim 1 wherein the flexible polymer is selected from the class consisting of fluoroelastomers including those containing hydrogen and those not containing hydrogen, perfluoroelastomers, and fluoroelastomers containing silicone moieties, nitrile elastomers, acrylic elastomers, olefin diene elastomers, chlorosulfonated polyethylene elastomers, polychloroprene elastomers, butyl and halogenated butyl elastomers, styrene-butadiene elastomers, polydiene elastomers and silicone elastomers.

3. A composite diaphragm as in claim 1 wherein the flexible polymer is selected from the class consisting ofcopolyetherester elastomers, polyurethane elastomers, styrene polyolefin block copolymer elastomers, polyamide elastomers, ethylene copolymer elastomers, and thermoplastic elastomers produced by the process of dynamic vulcanization.

4. A composite diaphragm as in claim 1 wherein the flexible polymer is selected from the class consisting of fluorinated thermoplastics consisting of copolymers of tetrafluoroethylene, copolymers of vinylidine fluoride, copolymers of chlorotrifluoroethylene, polyolefins, and plasticized polyvinyl chlorides.

5. A composite diaphragm as in claim 1 further comprising an elastomeric layer adhered to the layer of composite material.

6. A composite diaphragm as in claim 5 further comprising a reinforcing fabric embedded in the elastomeric layer.

7. A composite diaphragm as in claim 5 further comprising a series of concentrically arranged elastomeric ribs formed in the elastomeric layer.

8. A composite diaphragm as in claim 1 wherein the layer of composite material comprises a fabric of expanded porous polytetrafluoroethylene fibers laminated with a flexible polymer.

9. A composite diaphragm as in claim 1 wherein the layer of composite material comprises a fabric of expanded porous polytetrafluoroethylene fibers coated with a flexible polymer.

10. A composite diaphragm as in claim 1 wherein the layer of composite material comprises a fabric of expanded porous polytetrafluoroethylene fibers saturated with a flexible polymer.

11. A composite diaphragm comprising the following layers in sequence:
    (a) a continuous layer of solid polytetrafluoroethylene,
    (b) an elastomeric layer having a series of concentrically arranged elastomeric ribs formed in the elastomeric layer.

12. A composite diaphragm as in claim 1 or claim 11 having a planar form.

13. A composite diaphragm as in claim 1 or claim 11 having a molded form.

* * * * *